(12) United States Patent
Seibert et al.

(10) Patent No.: US 10,643,548 B2
(45) Date of Patent: May 5, 2020

(54) SELECTIVE DIMMING OF AMBIENT LIGHTING IN VIRTUAL, AUGMENTED, AND MIXED REALITY (XR) APPLICATIONS

(71) Applicant: Dell Products, L.P., Round Rock, TX (US)

(72) Inventors: Philip M. Seibert, Austin, TX (US); Christopher A. Torres, San Marcos, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/105,149

(22) Filed: Aug. 20, 2018

(65) Prior Publication Data

US 2020/0058256 A1  Feb. 20, 2020

(51) Int. Cl.
| | | |
|---|---|---|
| G09G 3/34 | (2006.01) | |
| G09G 3/32 | (2016.01) | |
| G09G 3/36 | (2006.01) | |
| G02B 27/01 | (2006.01) | |
| G06F 3/01 | (2006.01) | |
| G09G 3/20 | (2006.01) | |

(52) U.S. Cl.
CPC ....... *G09G 3/3406* (2013.01); *G02B 27/0172* (2013.01); *G06F 3/013* (2013.01); *G09G 3/2007* (2013.01); *G09G 3/3607* (2013.01); *G02B 2027/0138* (2013.01); *G09G 2320/0626* (2013.01); *G09G 2360/144* (2013.01)

(58) Field of Classification Search
CPC combination set(s) only.
See application file for complete search history.

(56) References Cited

U.S. PATENT DOCUMENTS

| | | | |
|---|---|---|---|
| 2013/0113973 A1* | 5/2013 | Miao | G09G 3/003 |
| | | | 348/333.01 |
| 2015/0138070 A1* | 5/2015 | Iwatsu | G02B 27/017 |
| | | | 345/156 |
| 2018/0129274 A1* | 5/2018 | Kono | G06F 3/0338 |
| 2018/0154260 A1* | 6/2018 | Sawaki | G06F 3/011 |
| 2018/0261166 A1* | 9/2018 | Seibert | G02B 27/0172 |
| 2018/0327817 A1* | 11/2018 | Wallace | C12Q 1/6816 |
| 2018/0374264 A1* | 12/2018 | Gatson | G06T 19/006 |
| 2019/0025586 A1* | 1/2019 | Sawaki | G02B 27/017 |
| 2019/0043263 A1* | 2/2019 | Nakashima | G06F 3/011 |

* cited by examiner

*Primary Examiner* — Wesner Sajous
(74) *Attorney, Agent, or Firm* — Fogarty LLP (57) ABSTRACT

Systems and methods for selective dimming of ambient lighting in virtual, augmented, and mixed reality (xR) applications. In some embodiments, an Information Handling System (IHS) may include one or more processors and a memory coupled to the one or more processors, the memory including program instructions stored thereon that, upon execution by the one or more processors, cause the IHS to: identify the presence of a light source in a physical space where a user is wearing a Head-Mounted Display (HMD) during operation of an xR application; and darken a portion of an optical filter within the HMD at a position in the user's field-of-view (FOV) corresponding to the light source.

20 Claims, 8 Drawing Sheets

SELECTIVE DIMMING OF AMBIENT LIGHTING IN VIRTUAL, AUGMENTED, AND MIXED REALITY (XR) APPLICATIONS

FIELD

The present disclosure generally relates to Information Handling Systems (IHSs), and, more particularly, to systems and methods for selective dimming of ambient lighting in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for selective dimming of ambient lighting in virtual augmented, and mixed reality (xR) applications are described. In an illustrative, non-limiting embodiment, an Information Handling System (IHS) may include one or more processors and a memory coupled to the one or more processors, the memory including program instructions stored thereon that, upon execution by the one or more processors, cause the IHS to: identify the presence of a light source in a physical space where a user is wearing a Head-Mounted Display (HMD) during operation of an xR application; and darken a portion of an optical filter within the HMD at a position in the user's field-of-view (FOV) corresponding to the light source.

The HMD may include a transparent or translucent display positioned between the user's eyes and the optical filter, where aspects of the xR application are rendered as one or more digital images overlaid upon the user's natural visual perception of the physical space. For example, the light source may include a window or a light fixture. To identify the presence of the light source, the program instructions may cause the IHS to: receive a video frame from an inside-out camera mounted on the HMD; and determine that a brightness of a portion of the video frame, at the position corresponding to the light source, is above a threshold value.

The program instructions, upon execution, may cause the IHS to: track a position of the light source as a landmark used by a Simultaneous Localization and Mapping engine, detect movement of the landmark relative to the HMD; and lighten the portion and darken another portion of the optical filter in response to the detection, wherein the other portion is at a new position in the user's FOV corresponding to the movement.

In some cases, optical filter may include a Liquid Crystal Display (LCD) having a plurality of pixels disposed in a matrix configuration. To darken the portion, the program instructions, upon execution, may cause the IHS to apply a voltage across a first subset of pixels to the exclusion of a second subset of pixels. The first subset of pixels may be larger than a bright spot created by the light source to compensate for a halo effect. Additionally, or alternatively, the voltage may be proportional to a brightness level of a bright spot created by the light source. Additionally, or alternatively, the voltage may be increased based upon a gaze vector, obtained by the HMD, indicating that the user is looking toward the bright spot. Additionally, or alternatively, the voltage may be is decreased based upon a gaze vector, obtained by the HMD, indicating that the user is looking away from the bright spot.

In another illustrative, non-limiting embodiment, a hardware memory device may have program instructions stored thereon that, upon execution by a processor of an HMD, cause the HMD to: identify a bright spot during execution of an Augmented Reality (AR) application where a digital image is overlaid, via a transparent or translucent display, upon a user's natural visual perception of a physical space; and darken a portion of a filter that corresponds to the bright spot, wherein the filter is optically coupled to the transparent or translucent display.

The program instructions may cause the HMD to: determine that a brightness of the bright spot has increased during operation of the AR application, and further darken the portion of the optical filter corresponding to the bright spot. The program instructions may also cause the HMD to determine that a brightness of the bright spot has decreased during operation of the AR application, and lighten the portion of the optical filter corresponding to the bright spot. Additionally, or alternatively, the program instructions may cause the HMD to determine that the light source is moving during operation of the AR application; and lighten the portion and darken another portion of the optical filter corresponding to the movement of the bright spot. Additionally, or alternatively, the program instructions may cause the HMD to determine that the user is looking away from the bright spot during operation of the AR application, and further darken the portion of the optical filter corresponding to the bright spot. Additionally, or alternatively, the program instructions may cause the HMD to determine that the user is looking toward the bright spot during operation of the AR application, and lighten the portion of the optical filter corresponding to the bright spot.

In yet another illustrative, non-limiting embodiment, a method may include identifying a bright spot created by a light source in a physical space during execution of an AR application; and reducing a transparency of a portion of an optical filter of an HMD executing the AR application, where the portion corresponds to the bright spot. The method may also include determining that a brightness of the bright spot has changed during operation of the AR application, and modifying a transparency of the portion. The method may also include determining that the user is looking towards or away from the bright spot during operation of the AR application; and modifying a transparency of the portion.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for selective dimming of ambient lighting in virtual, augmented, and mixed reality (xR) applications. These techniques are particularly useful in xR applications that employ HMDs, Heads-Up Displays (HUDs), and eyeglasses—collectively referred to as "HMDs." Although particularly applicable to HMDs, however, certain systems and methods described herein may be applied in many other display devices, such as, for example, a "smart windshield" (e.g., in cars, airplanes, etc.).

Figure 1A:
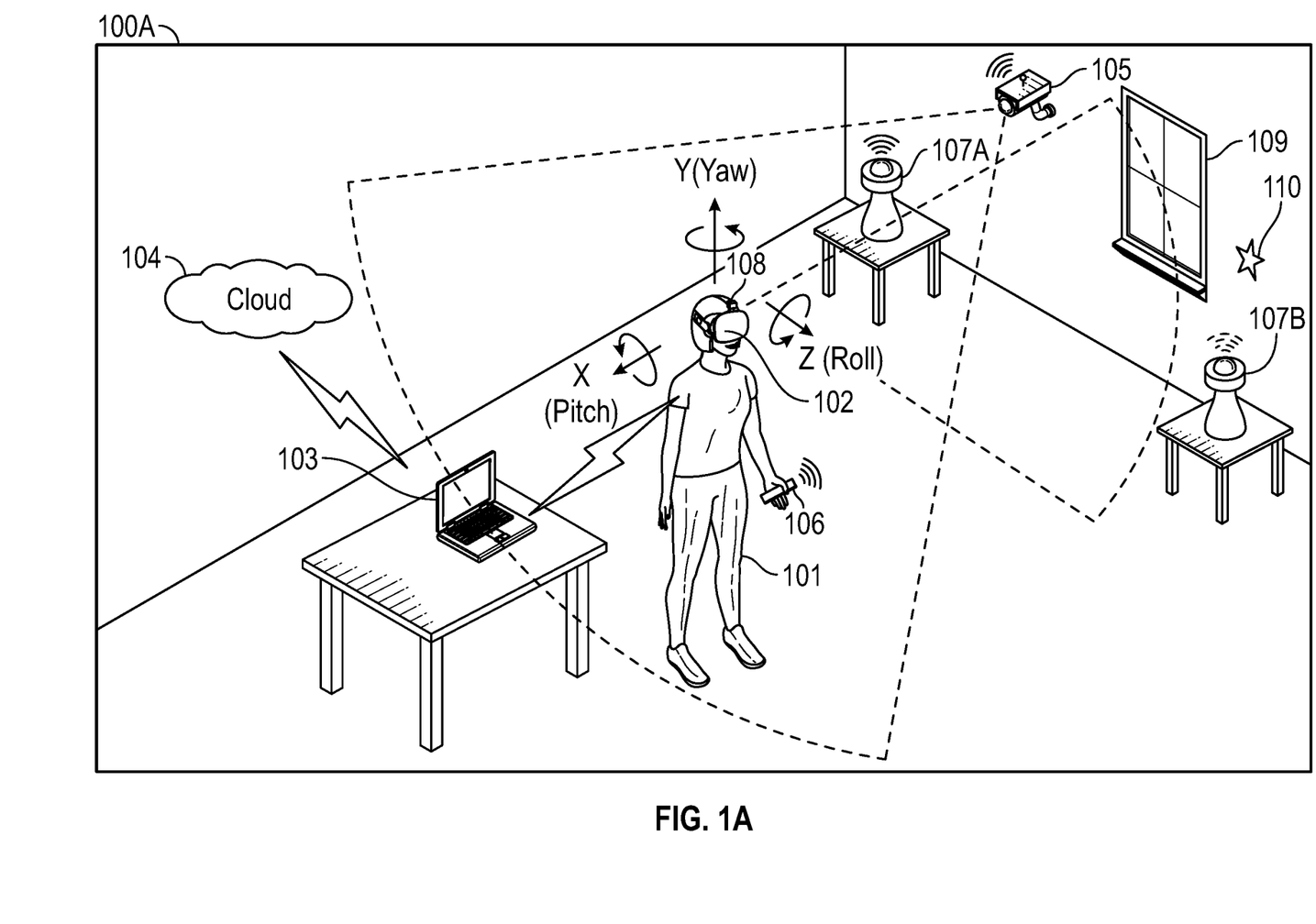
FIGS. 1A and 1B illustrate examples of environments where a virtual, augmented, or mixed reality (xR) application may be executed, according to some embodiments.

FIG. 1A is a perspective view of environment 100A where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100A, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100A, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

As used herein, the term SLAM refers systems and methods that use positional tracking devices to construct a map of an unknown environment where an HMD is located, and that simultaneously identifies where the HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100A and/or one or more totems 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In other cases, markerless inside-out tracking may use continuous searches and feature extraction techniques from video frames obtained by camera 108 (e.g., using visual odometry) to find natural visual landmarks (e.g., window 109) in environment 100A.

In various embodiments, data obtained from a positional tracking system and technique employed by HMD 102 may be received by host IHS 103, which in turn executes the SLAM method of an xR application. In the case of an inside-out SLAM method, for example, an xR application receives the position and orientation information from HMD 102, determines the position of selected features in the images captured by camera 108, and corrects the localization of landmarks in space using comparisons and predictions.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100A may be obtained, at least in part, from cloud 104.

As the inventors hereof have recognized, AR/MR imaging is generally susceptible to being overpowered or washed out in certain bright lighting conditions. Ambient light conditions in offices, factories, and other environments may include sources of relative bright light, such as windows and light fixtures. Brightening the AR/MR image may not be a viable solution to this problem, because it degrades the user experience, as well as display and battery life. Conversely, providing tinted a lens attachment or cover for the HMD, or dimming the whole environment at once may also be undesirable, because both bright and dark areas would be impacted.

Figure 1B:
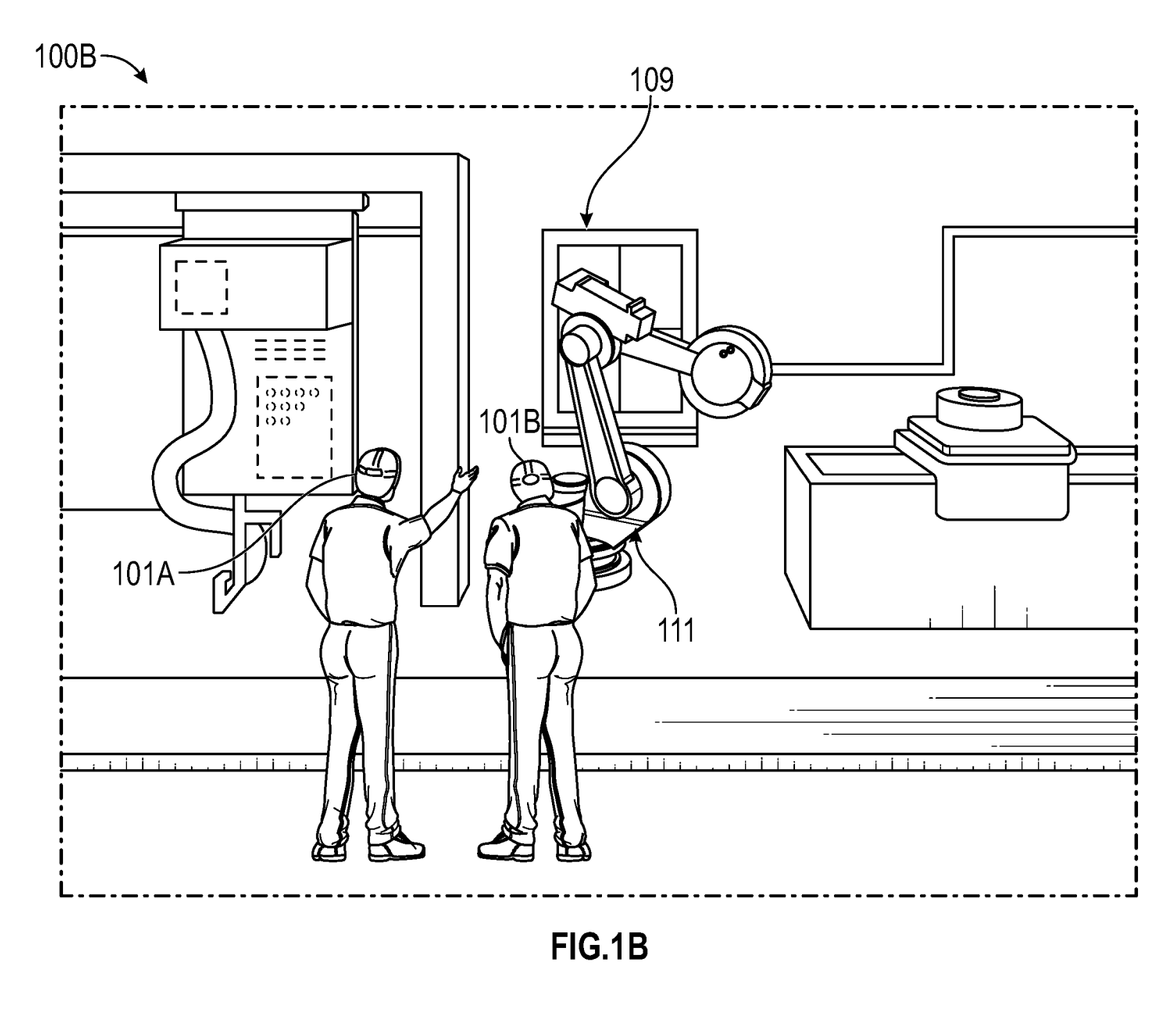

To illustrate this problem, FIG. 1B shows factory floor 100B, as an example of environment 100A, where user 101A and user 101B are each wearing a respective HMD. Through xR, one may situate a digital model of a piece of factory equipment on the actual factory floor, to check ranges of motion and clearances. In this scenario, virtual object (VO) 111 (e.g., a three-dimensional image) may be projected by each user's respective HMD's display at a position on factory floor 100B that lies between users 101A/B and window 109. As a result of light coming into environment 100B through window 109, however, a bright region tends to wash out the display of VO 111 inside of the users' HMDs.

In various embodiments, however, systems and methods described may be configured to control the visibility of a user's physical surroundings on-demand. To accomplish this, the level of external light passing through an HMD and reaching a user's eyes may be controlled using an optical filter, or the like. For example, still referring to FIG. 1B, using an optical filter, an HMD may detect that the VO 111 is backlit by window 109, and it may respond by dimming the area affected by the resulting bright spot only. Users 101A/B can then comfortably view the combined virtual and real image in appropriate contrast, and with high image quality.

Figure 2A:
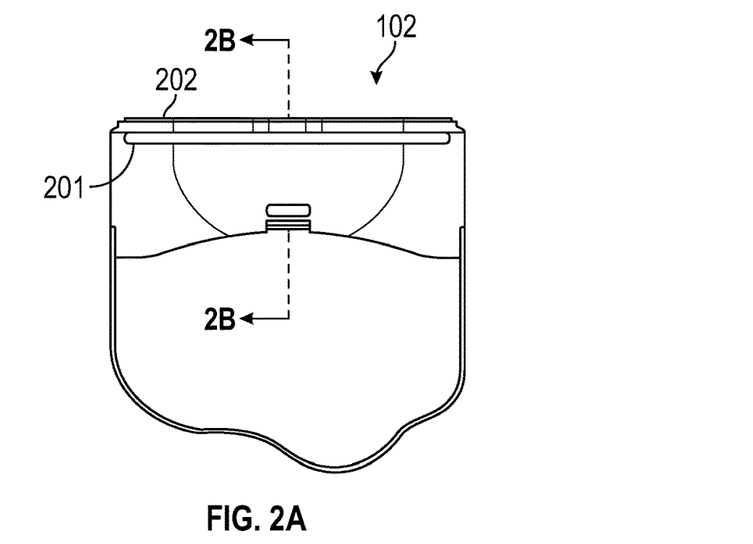
FIGS. 2A and 2B illustrate an example of an optical filter and a display layer of a Head-Mounted Display (HMD), according to some embodiments.
Figure 2B:
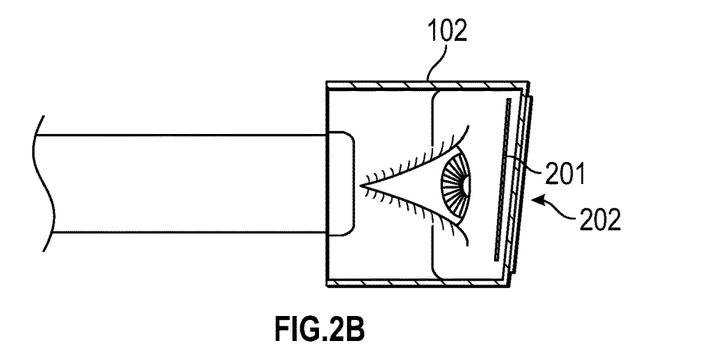

FIGS. 2A and 2B illustrate an example of HMD 102, according to some embodiments. Specifically, FIG. 2A shows a top view of HMD 102, and FIG. 2B illustrates a cross-section view of HMD 102.

As shown, a human user of HMD 102 can see its physical environment via a see-through a display system, glass, and/or lens 201. For example, HMD 102 may include one or more transparent or translucent Organic Light-Emitting Diode (OLED) displays comprising one or more flexible sheets of organic electroluminescent material. Additionally, or alternatively, transparent OLEDs may be replaced with a projected display (e.g., MICROSOFT's "Hololens").

In some cases, first OLED display may be disposed in front of the user's right eye, and a second OLED display may be disposed in front of the user's left eye. Alternatively, a single OLED display may be used for both eyes.

The OLED display(s) may show information in the form of virtual objects or VOs (e.g., characters, text, hyperlinks, images, graphics, etc.) overlaying a visible, natural physical environment in the user's field-of-view (FOV). In some cases, these VOs may be relevant to a physical object located within the environment (i.e., in an AR/MR application). Additionally, or alternatively, the OLED display(s) may completely immerse the user is a purely virtual, digital environment (e.g., in a VR application), such that, for practical purposes, the physical environment is no longer visible to the user.

Still referring to FIGS. 2A and 2B, optical filter or layer 202 may have the translucency of any portion thereof electronically controlled, ranging from 0% (completely opaque) to 100% (completely transparent), either continuously or in discrete levels. For example, layer 202 may be built with a monochrome LCD device having a plurality of pixels disposed in a matrix configuration. Additionally, or alternatively, layer 202 may be made with one or more sections of electro-chromic glass or polymer-dispersed liquid crystal (PDLC).

In various embodiments, systems and methods described herein may change the transparency or translucency perceived by a user of the HMD 102 by applying a control signal to contact(s), connector(s), interface(s), or input(s) of optical filter 202. This control signal may change in magnitude or value, for example, in connection with the detection of bright sports in the environment surrounding the user, and may depend upon the location and/or brightness of the bright spot. Additionally, or alternatively, the control signal may include a video frame with transparency values to be applied to each corresponding pixel in optical filter 202. Accordingly, systems and methods described herein enable the selective darkening or lightening of selected portions of optical filter 202, to varying degrees, to facilitate visualization of the xR application.

Figure 3:
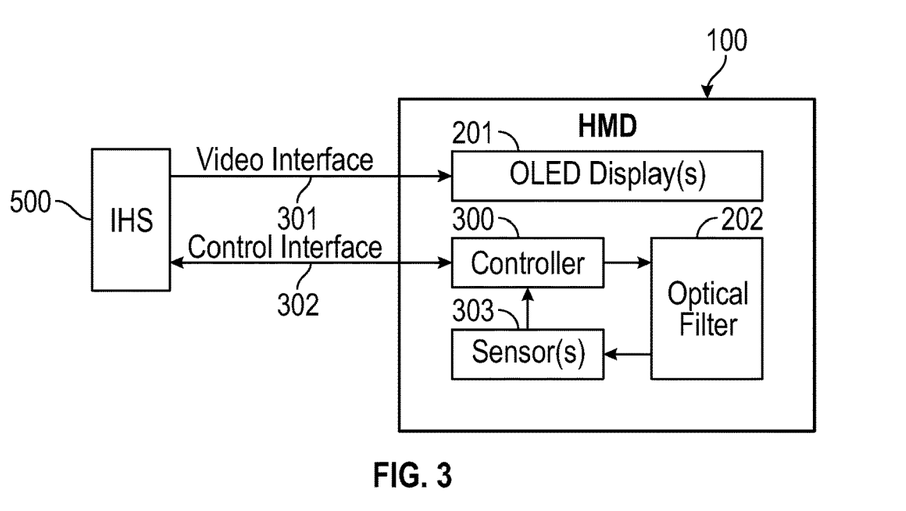
FIG. 3 illustrates an example of electronic components of an HMD, according to some embodiments.

FIG. 3 illustrates an example of electronic components of HMD 102 according to some embodiments. IHS 400, described in more detail below, is coupled to HMD 102 via a wired (e.g., USB) or wireless connection (e.g., Wi-Fi, Bluetooth, etc.), thus creating video interface 301 and control interface 302.

Video interface 301 drives both a right and left OLED displays 201 (one for each eye), in order to provide a 3D or stereoscopic view. In some cases, video interface may include two separate video interfaces, one for each OLED display 201. Additionally, or alternatively, a single DIS-PLAYPORT interface that supports multi-stream may be used to drive both displays 201. As noted above, each of the right and left-eye 201 display may be implemented as a transparent OLED.

Other resources coupled to or implemented by controller 300 may include, but are not limited to: a positional tracking system, a gesture tracking system, a gaze tracking system, and/or an inertial measurement unit (IMU) system.

In some embodiments, controller 300 may operate a positional tracking system that uses one or more optical sensors (e.g., a camera 108) configured to determine how HMD 102 moves in relation to environment 100A/B. For example, an inside-out tracking system may be configured to implement tracking techniques that use distinctive visual characteristics of the physical environment to identify specific images or shapes which are then usable to calculate HMD 102's position and orientation.

Controller 300 may also operate a gesture tracking system that uses one or more cameras or optical sensors that enable user 101 to use their actual hands for interaction with virtual objects (VOs) rendered by HMD 102. For example, a gesture tracking system may be configured to implement hand tracking and gesture recognition in a 3D-space via a user-facing 2D camera. In some cases, a gesture tracking system may track a selectable number of degrees-of-freedom (DOF) of motion, with depth information, to recognize dynamic hand gestures (e.g., swipes, clicking, tapping, grab and release, etc.) usable to control or otherwise interact with xR applications executed by HMD 102.

Generally, gesture detection begins when video frame data (e.g., a video or depth-video stream) is received at host IHS 103 from camera 108 of HMD 102. In some implementations, video data may have already been processed, to some degree, by controller 300 of HMD 102. Then, the video data is further processed to control aspects of an xR application, by identifying various gestures and sequences that constitute user input to the xR application.

At least a portion of the user's body may be identified in the video frame data obtained using camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a generalized geometric model of user 101. If a suitable fit is achieved, then pixels in that section may be recognized as those of user 101.

Gesture recognition may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.). Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

In other embodiments, the use of a virtual skeleton may not be necessary. For example, in other implementations, raw point-cloud data may be sent directly to a feature extraction routine within a gesture recognition module.

Controller 300 may further operate a gaze tracking system that uses an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, a gaze detection or tracking system may be configured to identify a direction, extent, and/or speed of movement of the user's eyes in real-time, during execution of an xR application (e.g., a gaze vector). In addition, a gaze detection or tracking system may be configured to calculate a region-of-interest of configurable size or shape (e.g., circular, rectangular, etc.), based in part upon the gaze vector.

In various implementations, tracking and/or gaze module may use NIR light sources to produce glints on the surface of the cornea of the user's eye, and then it may capture images of the eye region using an inward-facing camera. Controller 300 may estimate the user's gaze from the relative movement between the pupil center and glint positions. Particularly, an eye and/or gaze tracking algorithm may perform corneal reflection-based calculations that use NIR illumination to estimate the gaze direction or the point of gaze using polynomial functions, or a geometrical model of the human eye.

To perform gaze estimation, control 300 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, controller 300 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, controller 300 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, controller 300 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, controller 300 may be configured to follow the user's gaze direction for natural exploration of a visual scene by capturing the user's visual perspective. Moreover, controller 300 may also be configured to estimate user gaze and blink-state for interacting with the xR environment; several types of eye movements and gestures, such as saccades, smooth pursuit and nod-roll may be used. For example, eye tracking and/or gaze module 303 may be configured to use gaze, dwell time, and halfblink information for the purpose of hands-free object selection. Multiple input parameters may be used to avoid accidental selection of items. Pupil motion may be tracked to estimate a user's viewing point, with Kalman filtering to minimize pupil jitter and drifts.

In addition, controller 300 may implement an IMU system having one or more accelerometers and gyroscopes configured to measure and report a specific force and/or angular rate of the user's head. In some cases, an IMU system may be configured to a detect a direction, extent, and/or speed of rotation (e.g., an angular speed) of the user's head in real-time, during execution of an xR application.

In various embodiments, controller 300 may also be used to control the amount of translucency or transparency of optical filter 202 that covers the viewing area of HMD 102. In operation, controller 300 may receive inputs from an inside-out camera 108 and/or an Ambient Light Sensor (ALS) or array 303 in HMD 102, and it may use those inputs to detect bright spots, and to vary the translucency or transparency of selected regions of optical filter 202 in AR or MR modes to compensate for those bright spots. For example, sensor(s) 303 may provide that data to controller 300 to reduce the translucency or transparency of portions of optical filter 202 corresponding to the position and size of one or more bright spots, so that the brightness of the external environment does not wash out the image being displayed on transparent OLED(s) 201.

Controller 300 may also receive inputs from IHS 400 via interface 302, for example, which may cause host IHS 103 to: (i) turn selective dimming on or off in HMD 102; (ii) render selective dimming video frames for display by optical filter 202; (iii) allow a user to control the dimming of a bright spot using a gesture (e.g., a user's hand with a palm out covering a bright spot is indicative of the need for local dimming in that area); and/or (iv) track a user's eyes movement (e.g., using a gaze vector or any other measure of gaze focus/direction) and/or user's pupil size to determine how to best alleviate a given bright spot for a particular user, and to make the dimming behavior responsive to the xR application or context.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 4:
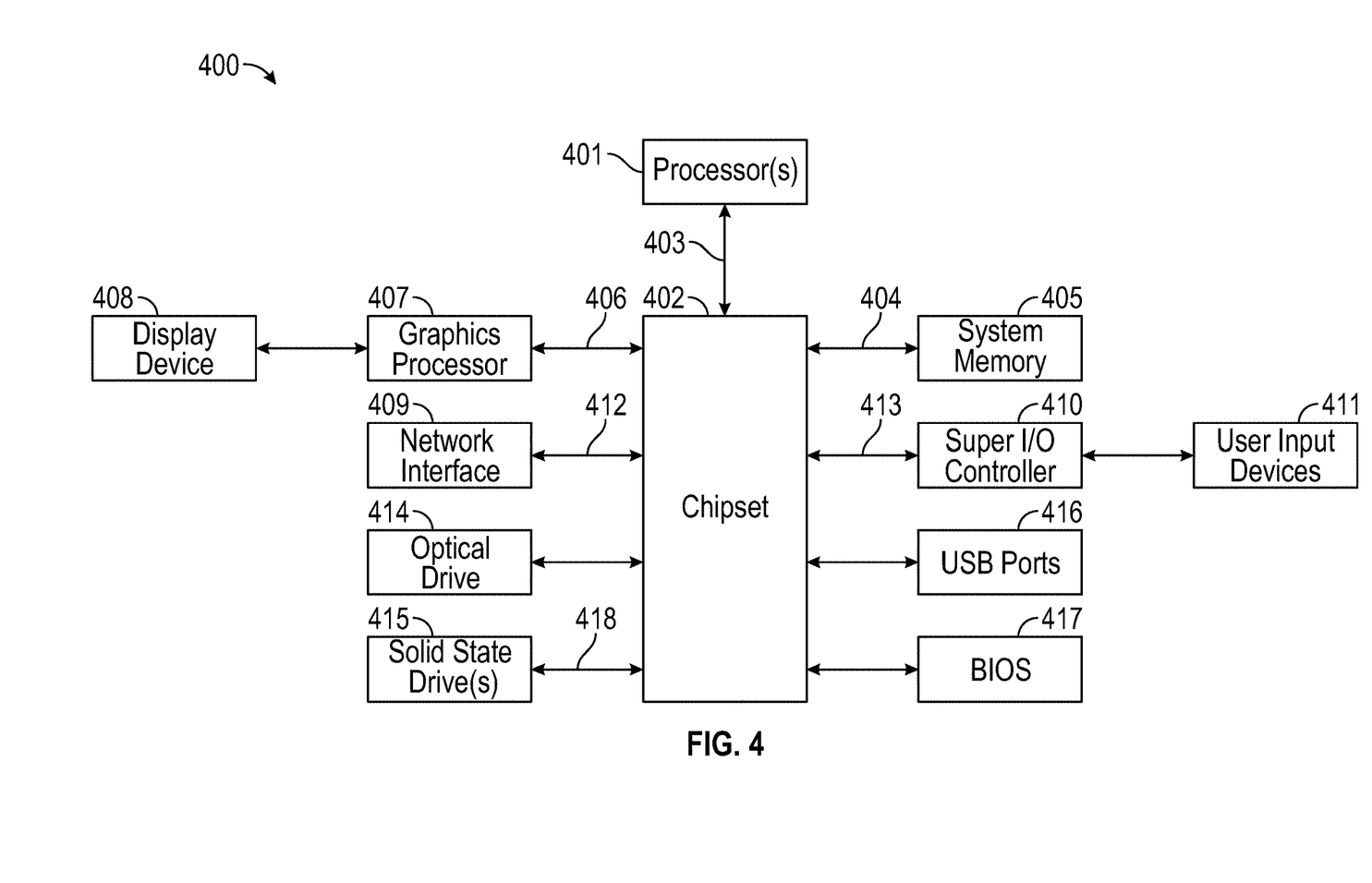
FIG. 4 illustrates an example of electronic components of an Information Handling System (IHS), according to some embodiments.

FIG. 4 is a block diagram of an IHS 400 configured to implement host IHS 103, according to certain embodiments. As shown, IHS 400 may include one or more processors 401. In various implementations, IHS 400 may be a single-processor system including one processor 401, or a multi-processor system including two or more processors 401. Processor(s) 401 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 400 includes chipset 402 that may include one or more integrated circuits that are connect to processor(s) 401. In certain embodiments, chipset 402 may utilize QuickPath Interconnect (QPI) bus 403 for communicating with the processor(s) 401. Chipset 402 provides the processor(s) 401 with access to a variety of resources. For instance, chipset 402 provides access to system memory 405 over memory bus 404. System memory 405 may be configured to store program instructions and/or data accessible by processors(s) 401. In various embodiments, system memory 405 may be implemented using any suitable memory technology, such as static RAM (SRAM), dynamic RAM (DRAM) or nonvolatile/Flash-type memory.

Chipset 402 may also provide access to graphics processor 407. In certain embodiments, graphics processor 407 may be comprised within one or more video or graphics cards that have been installed as components of the IHS 400. Graphics processor 407 may be coupled to the chipset 402 via a graphics bus 406 such as provided by an Accelerated Graphics Port (AGP) bus or a Peripheral Component Interconnect Express (PCIe) bus. In certain embodiments, graphics processor 407 generates display signals and provides them to HMD device 100 (or any other display device 408).

In certain embodiments, chipset 402 may also provide access to one or more user input devices 411. In such embodiments, chipset 402 may be coupled to a super I/O controller 410 that provides interfaces for a variety of user input devices 411, in particular lower bandwidth and low data rate devices. For instance, super I/O controller 410 may provide access to a keyboard and mouse or other peripheral input devices. In certain embodiments, super I/O controller 410 may be used to interface with coupled user input devices 411 such as keypads, biometric scanning devices, and voice or optical recognition devices, through wired or wireless connections. In certain embodiments, chipset 402 may be coupled to the super I/O controller 410 via a Low Pin-Count (LPC) bus 413.

Other resources may also be coupled to the processor(s) 401 of the IHS 400 through the chipset 402. In certain embodiments, chipset 402 may be coupled to a network interface 409, such as provided by a Network Interface Controller (NIC) that is coupled to the IHS 400. In certain embodiments, the network interface 409 may be coupled to the chipset 402 via a PCIe bus 412. According to various embodiments, network interface 409 may support communication via various wired and/or wireless networks. In certain embodiments, the chipset 402 may also provide access to one or more Universal Serial Bus (USB) ports 416.

Chipset 402 also provides access to one or more solid-state storage devices 415. The chipset 402 utilizes a PCIe bus interface connection 418 in order to communication with the solid-state storage device 415. In certain embodiments, chipset 402 may also provide access to other types of storage devices. For instance, in addition to the solid-state storage device 415, an IHS 400 may also utilize one or more magnetic disk storage devices, or other types of the storage devices such as an optical drive or a removable-media drive. In various embodiments, the solid-state storage device 415 may be integral to the IHS 400, or may be located remotely from the IHS 400.

Another resource that may be accessed by processor(s) 401 via chipset 402 is a Basic Input/Output System (BIOS) 417. As described in more detail below with respect to additional embodiments, upon powering or restarting IHS 400, processor(s) 401 may utilize BIOS 417 instructions to initialize and test hardware components coupled to the IHS 400 and to load an operating system for use by the IHS 400. BIOS 417 provides an abstraction layer that allows the operating system to interface with certain hardware components that are utilized by IHS 400. Via this hardware abstraction layer provided by BIOS 417, the software executed by the processor(s) 401 of IHS 400 is able to interface with certain I/O devices that are coupled to the IHS 400. The Unified Extensible Firmware Interface (UEFI) was designed as a successor to BIOS. As used herein, the term "BIOS" is intended to also encompass UEFI.

In various embodiments, HMD 102 and/or host IHS 103 may not include each of the components shown in FIGS. 3 and 4, respectively. Additionally, or alternatively, HMD 102 and/or host IHS 103 may include various components in addition to those that are shown in FIGS. 3 and 4. Furthermore, some components that are represented as separate components in FIGS. 3 and 4 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 5:
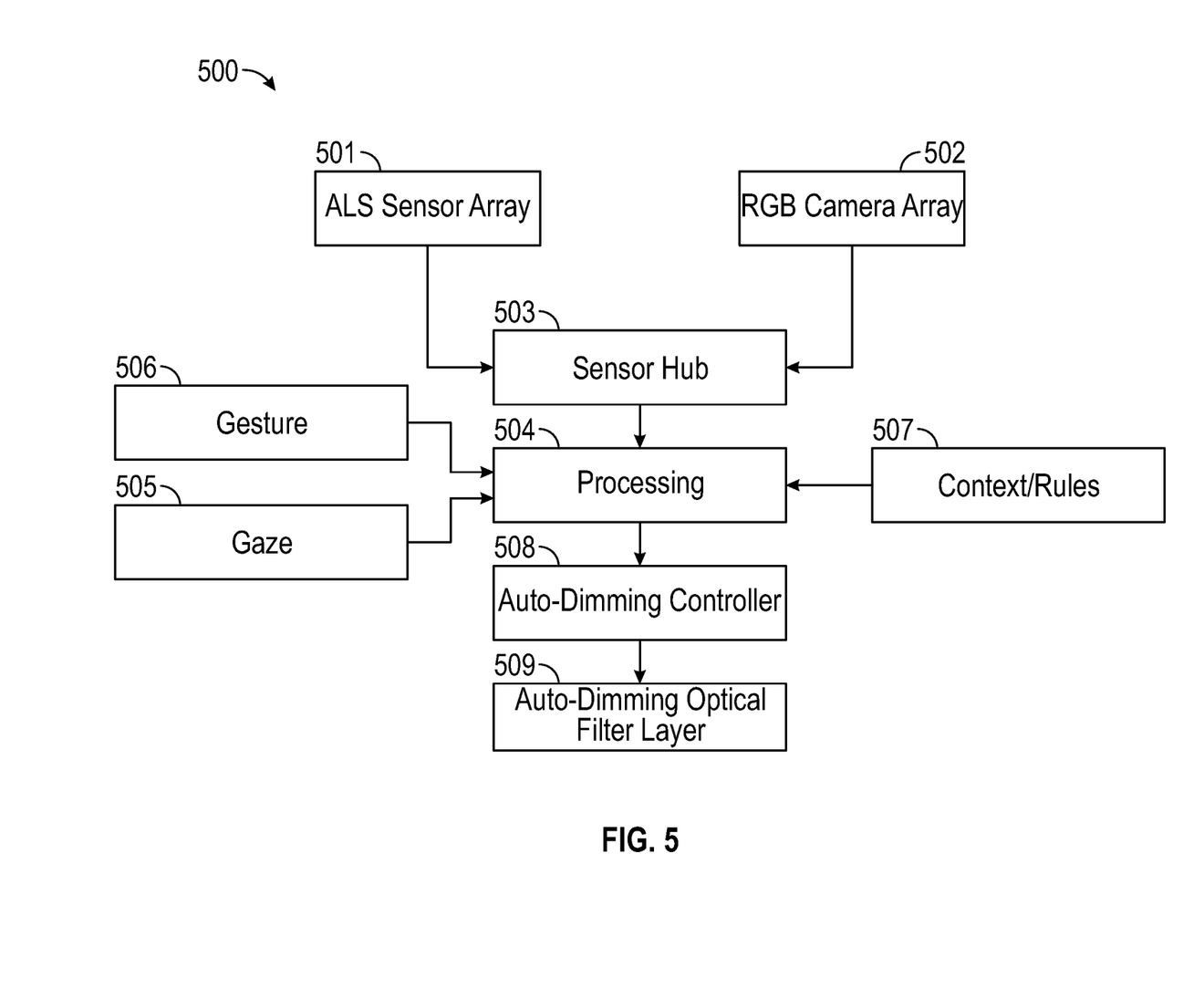
FIG. 5 illustrates an example of a selective dimming system, according to some embodiments.

FIG. 5 illustrates an example of selective dimming system 500. In some embodiments, selective dimming system 500 may include components of HMD 102 and host IHS 103. For example, in some cases, gesture processing 506 may be performed by host IHS 103, while gaze tracking 505 may be performed by HMD 102.

In system 500, Ambient Light Sensor (ALS) array 501 disposed on HMD 102 and RGB camera array 502 (e.g., camera 108) provide inputs to sensor hub 503 (e.g., controller 300 of HMD 102). Processing block 504 receives the output of sensor hub 503, as well as inputs from gaze tracking system 505, gesture recognition system 506, and/or context/rules database 507. Based upon one or more of these inputs, processing block 504 sends a control signal to auto-dimming controller 508, for example, in the form of one or more monochrome images to be displayed by optical filter 202.

Auto-dimming controller 508 in turn converts the control signal from processing block 504 into voltage signals configured to dynamically and programmatically modify the transparencies of each individual pixel in optical filter 202.

For example, to darken a portion of optical filter 202, auto-dimming controller 508 may apply a voltage across a first subset of pixels to the exclusion of a second subset of pixels. The voltage may be proportional to a brightness level of the bright spot, in each pixel. In some cases, the first subset of pixels may be larger than the bright spot to compensate for a halo effect.

Figure 6:
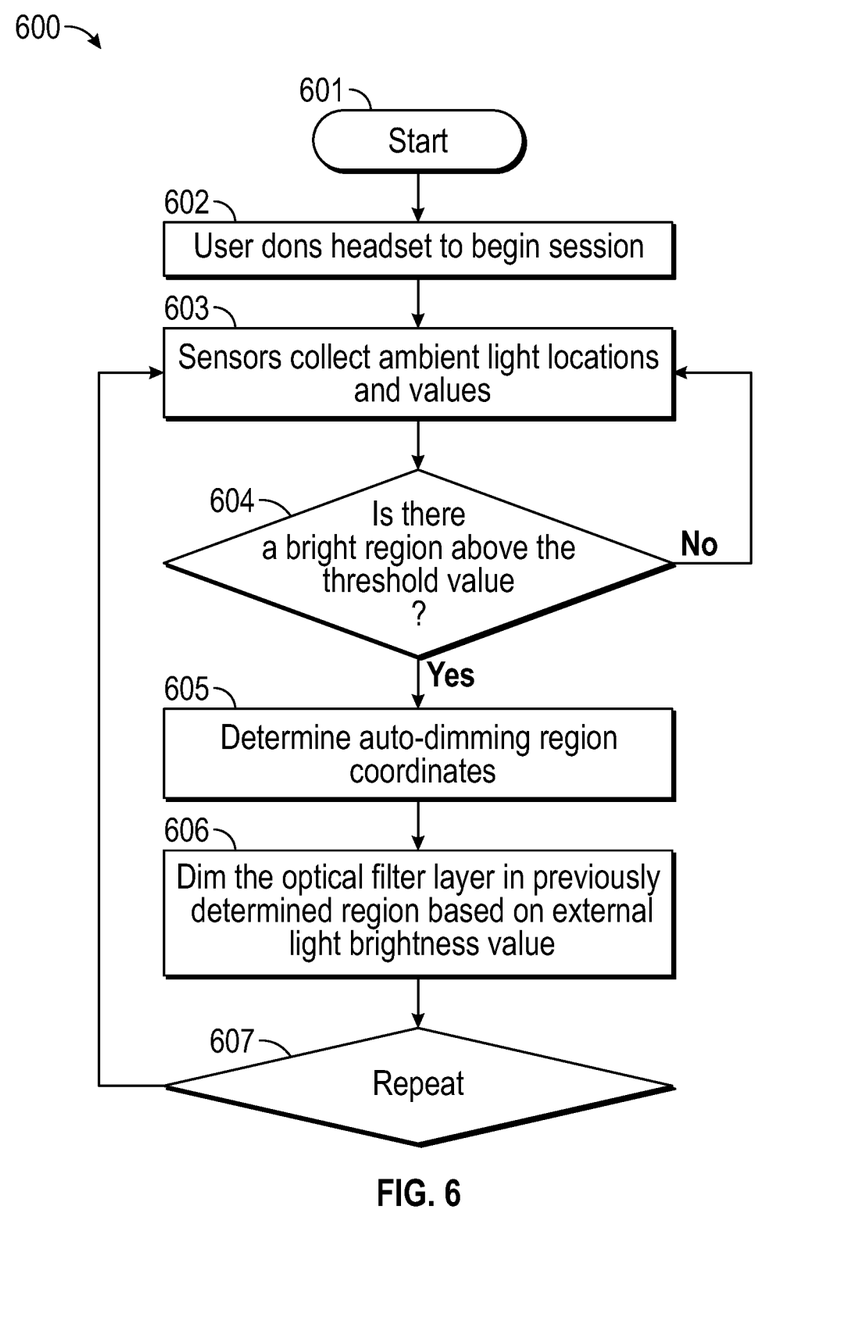
FIG. 6 illustrates an example of a method for selective dimming of ambient lighting in xR applications, according to some embodiments.

In some cases, processing block 504 may include tracking of a light source and/or bright spot, for example, using a SLAM system with the source or spot selected as a landmark. In these cases, method 600 may also track movement of the light source/landmark relative to HMD 102, and then lighten/darken portions of optical filter 202 in response to the detection, by causing the darker region of optical filter 202 track the source/spot as the source moves.

Additionally, or alternatively, processing block 504 may incorporate gesture recognition into the auto-dimming system. In some cases, for example, processing block 504 may enable a user to place a hand, with palm facing in, in front of a bright spot, to activate auto-dimming of that spot, or to increase dimming of the spot (e.g., reduce transparency in the region covered by the hand and/or increase size of region). In some implementations, the auto-dimming gesture may trigger auto-dimming when a VO object is being rendered in front of, or near a bright spot.

Additionally, or alternatively, processing block 504 may incorporate gaze tracking into the auto-dimming system. In some cases, processing block 504 may use a gaze vector to determine that the user is looking away from the bright spot, and it may: (i) further darken the portion of optical filter 202 corresponding to the bright spot, for instance, if context/rules database 507 indicates that the xR application being executed is design review application; or (ii) lighten or (take no action) in the area of the bright spot, for instance, if context/rules database 507 indicates that the xR application being executed requires visibility of bright spots (e.g., first responder or emergency personnel). In other cases, processing block 504 may use the gaze vector to determine that the user is looking toward the bright spot, and it may lighten or darken the portion of the optical filter corresponding to the bright spot, also depending upon context/rules database 507.

FIG. 6 illustrates an example of method 600 for selective dimming of ambient lighting. In some embodiments, method 600 may be performed by system 500 of FIG. 5 in response to the execution of program instructions stored in a hardware memory. Particularly, method 600 begins at block 601, and at block 602 user 101 wears HMD 102 to begin an xR application.

At block 603, sensors collect ambient light locations and values. Block 604 determines whether there is a region or spot with a brightness value above a selected threshold. Block 605 determines an amount of dimming to be applied to a portion of optical filter 202 in the user's FOV corresponding to the coordinates of the bright region or spot, for example, in the surrounding physical environment. Block 606 dims optical filter 202 in the selected region based upon the external brightness value, and block 607 causes these operations to be repeated during execution of the xR application.

As such, method 600 may identify the presence of a light source darken a portion of optical filter 202 within the HMD 203 at a position in the user's FOV corresponding to the light source. Additionally, or alternatively, method 600 may determine that a brightness of the bright spot has increased during operation of the AR application; and further darken the portion of the optical filter corresponding to the bright spot. Additionally, or alternatively, method 600 may determine that a brightness of the bright spot has decreased during operation of the AR application; and lighten the portion of the optical filter corresponding to the bright spot. Additionally, or alternatively, method 600 may determine that the light source is moving during operation of the AR application; and lighten the portion and darken another portion of the optical filter corresponding to the movement of the bright spot.

Figure 7A:
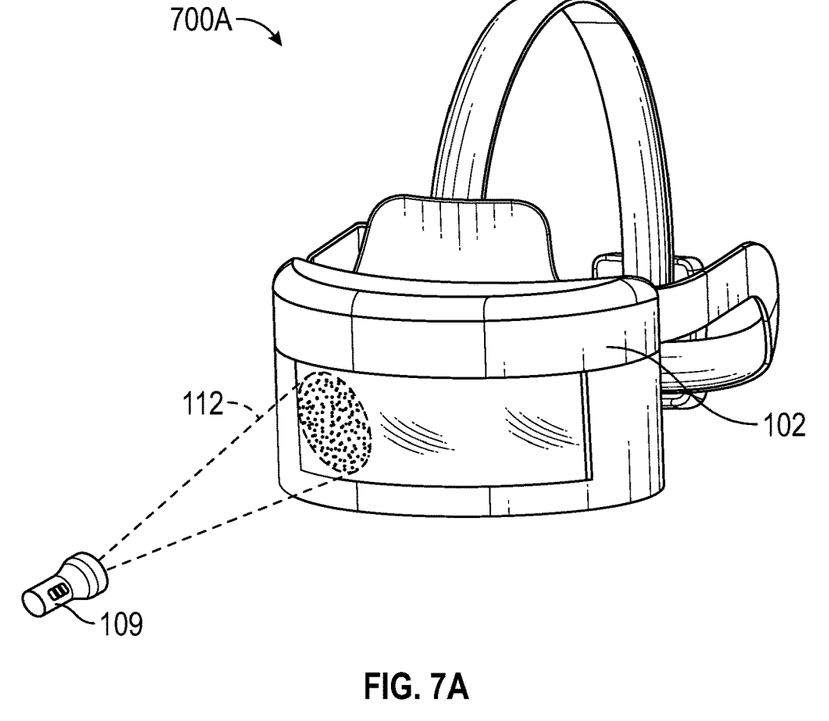
FIGS. 7A-C illustrate a use-case of selective dimming of ambient lighting in xR applications, according to some embodiments.
Figure 7B:
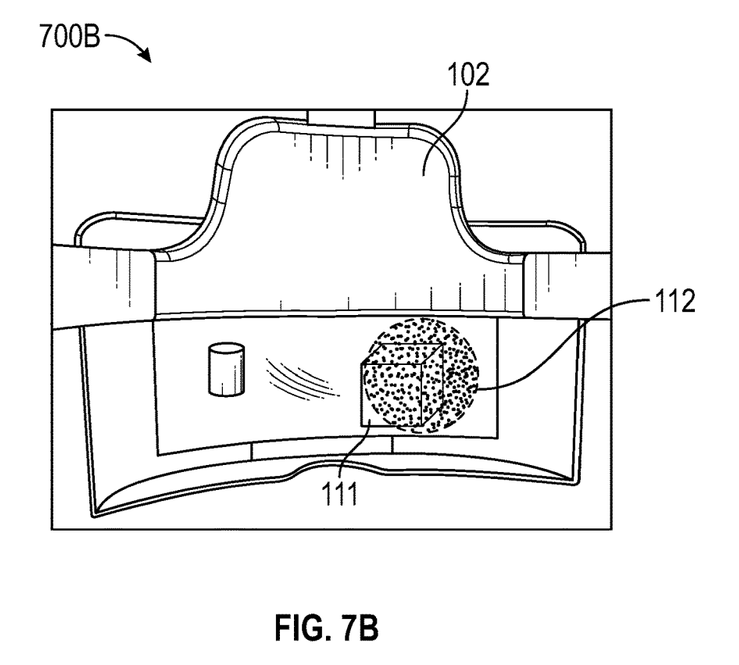
Figure 7C:
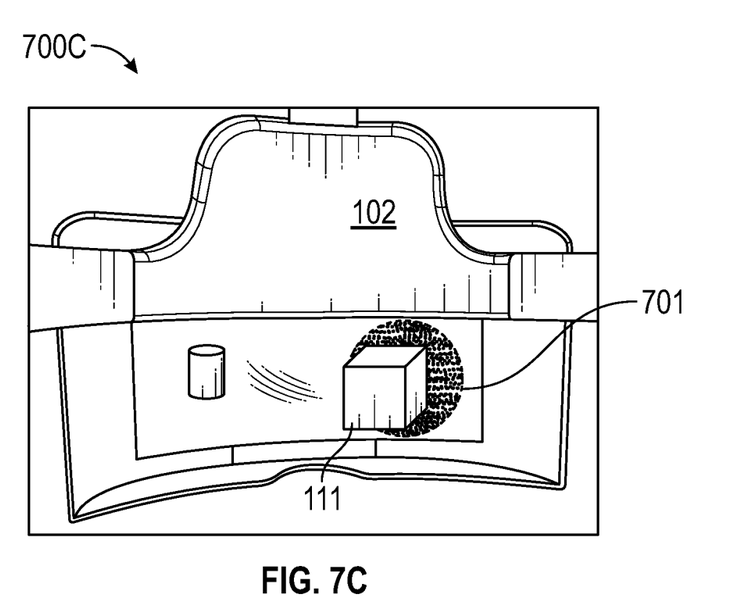

FIGS. 7A-C illustrate a use-case of selective dimming of ambient lighting in xR applications. Particularly, configuration 700A shows ambient light source 109 (e.g., window 109 in FIG. 1) causing bright spot 112 to hit the display of HMD 102. Configuration 700B shows VO 111 rendered in front of bright spot 112, and therefore washed out. Using the systems and methods described herein, however, configuration 700C shows dynamic darkening of region 701 of optical filter 202, immediately behind VO 111, which great improves the visibility of VO 111 to user 101.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
one or more processors; and
a memory coupled to the one or more processors, the memory including program instructions stored thereon that, upon execution by the one or more processors, cause the IHS to:
receive a video frame from an inside-out camera mounted on a Head-Mounted Display (HMD);
identify the presence of a light source in a physical space where a user is wearing the HMD during operation of a virtual, augmented, or mixed reality (xR) application, at least in part, by determining that a brightness of a portion of the video frame at a position corresponding to the light source is above a threshold value; and
darken a portion of an optical filter within the HMD at a position in the user's field-of-view (FOV) corresponding to the light source.

2. The IHS of claim 1, wherein the HMD further comprises a transparent or translucent display positioned between the user's eyes and the optical filter, where aspects of the xR application are rendered as one or more digital images overlaid upon the user's natural visual perception of the physical space.

3. The IHS of claim 1, wherein the light source comprises a window or a light fixture.

4. The IHS of claim 1, wherein the program instructions, upon execution, further cause the IHS to:
track a position of the light source as a landmark used by a Simultaneous Localization and Mapping engine;
detect movement of the landmark relative to the HMD; and
lighten the portion and darken another portion of the optical filter in response to the detection, wherein the other portion is at a new position in the user's FOV corresponding to the movement.

5. The IHS of claim 1, wherein the optical filter comprises a Liquid Crystal Display (LCD) having a plurality of pixels disposed in a matrix configuration.

6. The IHS of claim 5, wherein to darken the portion, the program instructions, upon execution, further cause the IHS to apply a voltage across a first subset of the plurality of pixels to the exclusion of a second subset of the plurality of pixels.

7. The IHS of claim 6, wherein the first subset of the plurality of pixels is larger than a bright spot created by the light source to compensate for a halo effect.

8. The IHS of claim 6, wherein the voltage is proportional to a brightness level of a bright spot created by the light source.

9. The IHS of claim 8, wherein the voltage is increased based upon a gaze vector, obtained by the HMD, indicating that the user is looking toward the bright spot.

10. The IHS of claim 8, wherein the voltage is decreased based upon a gaze vector, obtained by the HMD, indicating that the user is looking away from the bright spot.

11. A hardware memory device having program instructions stored thereon that, upon execution by a processor of a Head-Mounted Display (HMD), cause the HMD to:
   identify a bright spot during execution of an Augmented Reality (AR) application where a digital image is overlaid, via a transparent or translucent display, upon a user's natural visual perception of a physical space;
   darken a portion of a filter that corresponds to the bright spot, wherein the filter is optically coupled to the transparent or translucent display; and
   at least one of:
      (a) determine that the user is looking away from the bright spot, and further darken the portion of the filter corresponding to the bright spot;
      (b) determine that the user is looking toward the bright spot, and lighten the portion of the filter corresponding to the bright spot; or
      (c) determine that the bright spot is moving, and lighten the portion and darken another portion of the filter corresponding to the movement of the bright spot.

12. The hardware memory device of claim 11, wherein the program instructions, upon execution, further cause the HMD to:
   determine that a brightness of the bright spot has increased during operation of the AR application; and
   further darken the portion of the filter corresponding to the bright spot.

13. The hardware memory device of claim 11, wherein the program instructions, upon execution, further cause the HMD to:
   determine that a brightness of the bright spot has decreased during operation of the AR application; and
   lighten the portion of the filter corresponding to the bright spot.

14. A method, comprising:
   identifying a bright spot created by a light source in a physical space during execution of an Augmented Reality (AR) application;
   reducing a transparency of a portion of an optical filter of a Head-Mounted Display (HMD) executing the AR application, wherein the portion corresponds to the bright spot;
   determining that the user is looking towards or away from the bright spot; and
   modifying the transparency of the portion.

15. The method of claim 14, further comprising:
   determining that a brightness of the bright spot has changed during operation of the AR application; and
   modifying the transparency of the portion.

16. An Information Handling System (IHS), comprising:
   one or more processors; and
   a memory coupled to the one or more processors, the memory including program instructions stored thereon that, upon execution by the one or more processors, cause the IHS to:
      identify the presence of a light source in a physical space where a user is wearing a Head-Mounted Display (HMD) during operation of a virtual, augmented, or mixed reality (xR) application; and
      darken a portion of an optical filter within the HMD at a position in the user's field-of-view (FOV) corresponding to the light source, wherein the optical filter comprises a Liquid Crystal Display (LCD) having a plurality of pixels disposed in a matrix configuration and wherein to darken the portion, at least in part by applying a voltage across a first subset of the plurality of pixels to the exclusion of a second subset of the plurality of pixels.

17. The IHS of claim 16, wherein the first subset of the plurality of pixels is larger than a bright spot created by the light source to compensate for a halo effect.

18. The IHS of claim 16, wherein the voltage is proportional to a brightness level of a bright spot created by the light source.

19. The IHS of claim 18, wherein the voltage is increased based upon a gaze vector, obtained by the HMD, indicating that the user is looking toward the bright spot.

20. The IHS of claim 18, wherein the voltage is decreased based upon a gaze vector, obtained by the HMD, indicating that the user is looking away from the bright spot.

* * * * *